April 21, 1931. A. HAISTER 1,802,251

UNWINDING DEVICE FOR BOLTS OF CLOTH

Filed June 15, 1928

AARON HAISTER, INVENTOR

BY Victor J. Evans, ATTORNEY

WITNESS: M.H. Ford

Patented Apr. 21, 1931

1,802,251

UNITED STATES PATENT OFFICE

AARON HAISTER, OF BROOKLYN, NEW YORK, ASSIGNOR TO MAX BRETH, OF NEW YORK, N. Y., DOING BUSINESS AS BRETH SYSTEM

UNWINDING DEVICE FOR BOLTS OF CLOTH

Application filed June 15, 1928. Serial No. 285,716.

This invention relates to improvements in unwinding devices for bolts of cloth.

The primary object of the invention resides in a device for turnably supporting a bolt of cloth capable of being supported upon a stand or held in the hands of an operator for conveniently unwinding a length of cloth from its bolt when it is desired to lay out the same for cutting.

Another object of the invention is to provide an adjustable frame having adjustable pintles diametrically arranged for embedding themselves in the ends of a bolt of cloth to turnably accommodate bolts of various lengths.

A further object is the provision of a device of the kind mentioned which is simple of construction, easy to set up for use, and which facilitates the rapid unwinding of the cloth from the bolt without fear of creasing.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1:
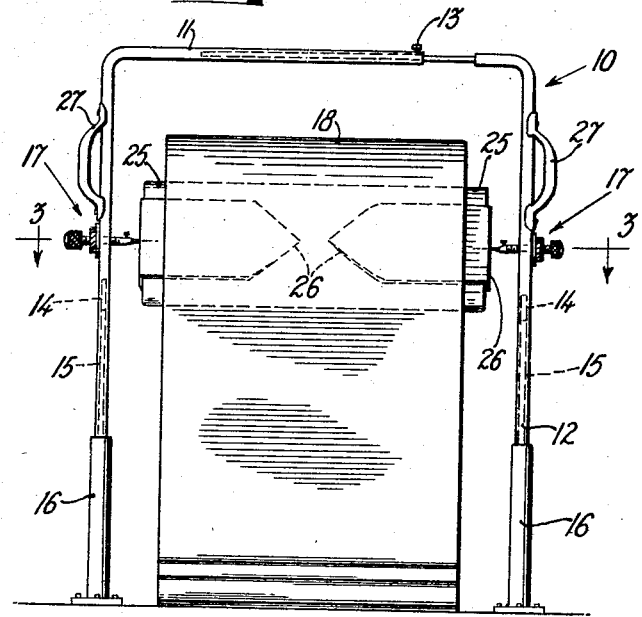
Figure 1 is a front elevation of my improved unwinding device.
Figure 2:
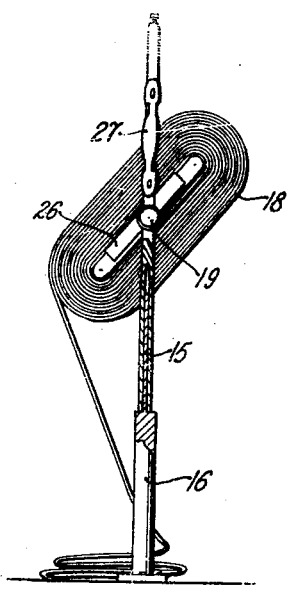
Figure 2 is an end view of the same.

Referring to the drawing by reference characters, the numeral 10 designates a U-shaped frame constructed of a pair of L-shaped sections 11 and 12, the section 12 telescoping the section 11 so as to be adjustable in order to accommodate bolts of cloth of various lengths. A set screw 13 is provided for holding the sections in an adjusted position. The vertical legs of the frame are provided with sockets 14 for receiving pins 15 provided on the tops of supporting posts 16 which are fixedly secured to a supporting structure and which are arranged in suitable spaced relation.

The legs of the frame also support diametrically opposed trunnions 17 for turnably supporting a bolt of cloth 18.

Each of the adjustable trunnions 17 comprises a thumb screw 19 threaded into a leg of the frame and which screw has its free end provided with a socket 20 for removably receiving a pointed pin 21 which is held in the socket by a set screw 22. For the purpose of holding the thumb screw in an adjusted position, I provide a lock nut 23 on the threaded shank of the screw which is adapted to be screwed tight against a washer 24 to hold the thumb screw against accidental turning. To adjust the thumb screw, it becomes necessary to loosen the thumb nut 23 whereupon the thumb screw is free to be turned.

Figure 3:
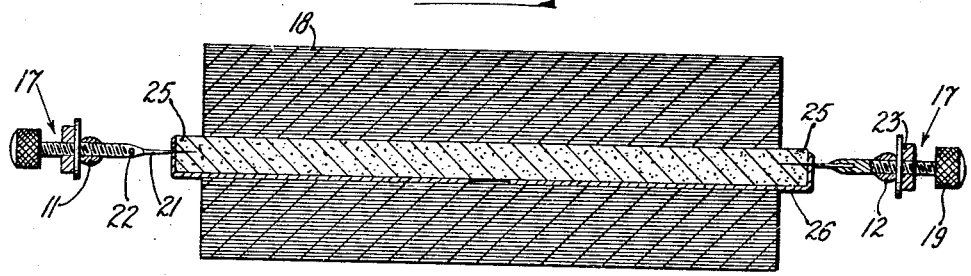
Figure 3 is a horizontal sectional view on the line 3—3 of Figure 1.

It will be appreciated that the bolt or core 25 of the bolt of cloth 18 is usually constructed of cardboard and in order to provide a reinforced bearing by which the bolt of cloth may be turnably supported by the trunnions, I provide metal clips 26 which embrace the ends of the bolt and are slid between the inner windings of the cloth as clearly shown in Figure 3 of the drawing. The ends of these clips may be provided with openings whereby the pointed pins 21 may be embedded into the bolt by effecting adjustment of the thumb screws whereupon the bolt of cloth is turnably supported within the frame.

Figure 4:
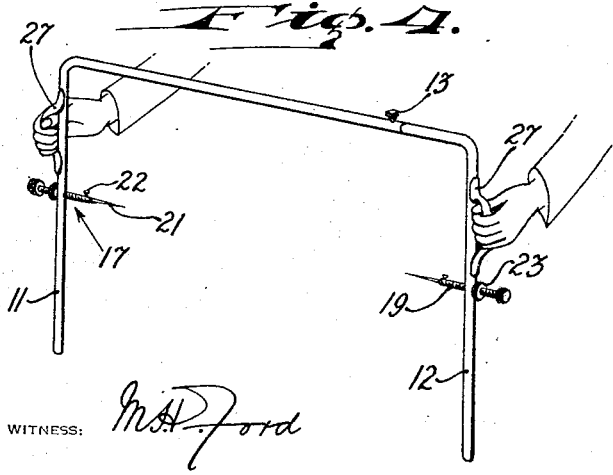
Figure 4 is a detail perspective view of the device showing the same held by the hands of a user.
Figure 5:
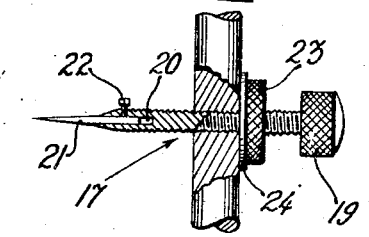
Figure 5 is an enlarged detail sectional view of one of the adjustable trunnions.

With reference to Figure 1 of the drawing, it will be noted that upon turning of the bolt, the cloth wound thereon will unwind and drop to the supporting surface and if desired, a box-like receptacle could be provided for receiving the cloth during the unwinding operation. If desired, the frame may be held in a supported position by the hands of an operator and for this purpose, I provide hand grips 27 on the legs of the frame structure which are grasped in the manner shown in Figure 4. The operator may manipulate the frame after the bolt has started to unwind and which will continue to turn without requiring touching of the bolt.

By making the frame structure adjustable it is possible to initially adjust the device to receive a bolt of cloth of a given length while the final adjustment with respect to the bolt of cloth may be effected by the adjustment of the trunnions 17. Should the bearing pins 21 become broken or worn they may be removed by loosening the set screws 22 and substituting new pins therefor.

What is claimed as new is:—

1. A device of the class described comprising a pair of parallel spaced legs, pointed pins carried by said legs for revolvably supporting thereon a web of material rolled on a core and disposed between said legs, and strips of rigid material insertible between the rolled material and its core and adapted to reinforce the ends of the latter for receiving said pins, there being apertures in the rigid material to form bearings for the pins.

2. A device of the class described including a pair of parallel spaced legs, projections carried by said legs for revolvably supporting thereon a web of material rolled on a core and disposed between said legs, and metallic clips inserted between the rolled material and its core, to reinforce the ends of the core, said metallic clips having apertures to receive and form bearings for said projections.

In testimony whereof I have affixed my signature.

AARON HAISTER.